United States Patent [19]

Park

[11] Patent Number: 5,348,795
[45] Date of Patent: Sep. 20, 1994

[54] PROCESS FOR MAKING A DIMENSIONALLY-STABLE OPEN-CELL POLYPROPYLENE FOAM WITH ORGANIC BLOWING AGENTS

[75] Inventor: Chung P. Park, Pickerington, Ohio

[73] Assignee: The Dow Chemical Company, Midland, Mich.

[21] Appl. No.: 178,582

[22] Filed: Jan. 7, 1994

Related U.S. Application Data

[63] Continuation of Ser. No. 988,057, Dec. 9, 1992, abandoned.

[51] Int. Cl.$^5$ ................................................ B32B 5/20
[52] U.S. Cl. ................................ 428/220; 428/319.9; 521/79; 521/142; 521/143
[58] Field of Search ............... 428/220, 319.9; 521/79, 521/142, 143, 910

[56] References Cited

U.S. PATENT DOCUMENTS

| | | | |
|---|---|---|---|
| 3,481,455 | 12/1969 | Graham et al. | 264/50 |
| 3,637,458 | 1/1972 | Parrish | 161/160 |
| 3,871,897 | 3/1975 | Ealding | 117/15 |
| 3,932,569 | 1/1976 | Fuss | 264/51 |
| 4,054,550 | 10/1977 | Parker et al. | 521/79 |
| 4,232,130 | 11/1980 | Baxter et al. | 521/79 |
| 4,298,706 | 11/1981 | Ueno et al. | 521/92 |
| 4,522,955 | 6/1985 | Fukushima et al. | 521/143 |
| 4,714,716 | 12/1987 | Park | 521/80 |
| 4,832,770 | 5/1989 | Nojiri et al. | 156/78 |

*Primary Examiner*—Morton Foelak
*Attorney, Agent, or Firm*—J. Robert Dean, Jr.

[57] ABSTRACT

Disclosed is a process for making a low density, dimensionally-stable, open-cell, extruded propylene polymer foam comprising primarily an expanded propylene polymer material wherein the foam has a blowing agent comprising greater than 85 percent by weight of one or more organic blowing agents based upon the total weight of the blowing agent. The propylene polymer material comprises more than 50 weight percent or more of propylene monomeric units based upon the total weight of the propylene polymer material. The foam has a density about 96 kilograms or less per cubic meter. The foam is greater than 20 percent open cell.

9 Claims, No Drawings

PROCESS FOR MAKING A
DIMENSIONALLY-STABLE OPEN-CELL
POLYPROPYLENE FOAM WITH ORGANIC
BLOWING AGENTS

CROSS-REFERENCE TO RELATED APPLICATION

This is a continuation of application Ser. No. 07/988,057, filed Dec. 9, 1992, now abandoned.

BACKGROUND OF THE INVENTION

This invention relates to a low density, dimensionally-stable, open-cell, extruded propylene polymer foam blown with a blowing agent comprising partly or entirely of one or more organic blowing agents. The foam offers excellent cushioning properties.

Propylene polymer foams are known in the art, and are useful in many applications such as seen in U.S. Pat. Nos. 3,481,455, 3,871,897, 3,932,569, 4,522,955, and 4,832,770. Such foams have been made with a wide variety of organic and inorganic blowing agents.

It would be desirable to have an open-cell, low density propylene polymer foam (96 kilograms per cubic meter or less) for use in cushioning applications. While closed-cell polyolefin foams, most notably ethylene polymer foams, have typically been used in such applications, it would be desirable to use an open-cell foam for environmental reasons. Open-cell foams lose blowing agent much faster than closed-cell foams. Quick release of blowing agent is important when utilizing volatile blowing agents, the release of which is increasingly subject to governmental regulation. Quick release of blowing agent allows the foam manufacturer to recover all or a substantial portion of the blowing agent prior to providing the foam to the consumer.

It would be further desirable to have an open-cell, low density propylene polymer foam that is dimensionally stable. Open-cell polyolefin foams typically are more difficult to expand to low densities than corresponding closed-cell foams because they lose blowing agent more quickly. It would be desirable to have an open-cell, propylene polymer foam that affords quick release of blowing agent while achieving a high expansion.

SUMMARY OF THE INVENTION

According to the present invention, there is a low density, dimensionally-stable, open-cell, extruded propylene polymer foam comprising a propylene polymer material wherein the foam has a blowing agent comprising greater than 85 percent or more by weight of one or more organic blowing agents based upon the total weight of the blowing agent. The propylene polymer material comprises greater than 50 percent by weight propylene monomeric units based upon the weight of the propylene polymer material. The foam has a density of about 96 or less kilograms per cubic meter and preferably less than about 96 kilograms per cubic meter. The foam has an open cell content of more than 20 percent.

Further according to the present invention, there is a process for making a dimensionally-stable, extruded, open-cell propylene polymer foam. The process comprises the steps of (a) heating the propylene polymer material comprising greater than 50 weight percent propylene monomeric units to form a melt polymer material based upon the weight of the propylene polymer material; (b) incorporating into the melt polymer material a blowing agent comprising greater than 85 weight percent of one or more organic blowing agents based upon the total weight of the blowing agent to form a foamable gel; (c) extruding the foamable gel through a die to form the foam.

DETAILED DESCRIPTION OF THE INVENTION

Suitable propylene polymer materials include propylene homopolymers (polypropylene) and copolymers of propylene and copolymerizable ethylenically unsaturated comonomers. The propylene polymer material may further include non-propylenic polymers in small amounts. The propylene polymer material may be comprised solely of one or more propylene homopolymers, one or more propylene copolymers, a blend of one or more of each of propylene homopolymers and copolymers, or blends of any of the foregoing with a non-propylenic polymer. Regardless of composition, the propylene polymer material comprises at greater than 50 and preferably greater than 70 weight percent of propylene monomeric units.

Suitable monoethylenically unsaturated comonomers include olefins, vinylacetate, methylacrylate, ethylacrylate, methyl methacrylate, acrylic acid, itaconic acid, maleic acid, maleic anhydride, and the like. A propylene copolymer preferably comprises about 20 percent or less by weight of the ethylenically unsaturated comonomer.

Particularly useful propylene copolymers are those copolymers of propylene and one or more non-propylenic olefins. Propylene copolymers include random and block copolymers of propylene and an olefin selected from the group consisting of ethylene, $C_4$–$C_{10}$ 1-olefins, and $C_4$–$C_{10}$ dienes. Propylene copolymers also include random terpolymers of propylene and 1-olefins selected from the group consisting of ethylene and $C_4$–$C_8$ 1-olefins. In terpolymers having both ethylene and $C_4$–$C_8$ 1-olefins, the ethylene content is preferably 20 percent or less by weight. The $C_4$–$C_{10}$ 1-olefins include the linear and branched $C_4$–$C_{10}$ 1-olefins such as, for example, 1-butene, isobutylene, 1-pentene, 3-methyl-1-butene, 1-hexene, 3,4-dimethyl-1-butene, 1-heptene, 3-methyl-1-hexene, and the like. Examples of $C_4$–$C_{10}$ dienes include 1,3-butadiene, 1,4-pentadiene, isoprene, 1,5-hexadiene, 2,3-dimethyl-1,3-hexadiene, and the like.

Suitable non-propylenic polymers incorporatable in the propylene polymer material include high, medium, low, and linear density polyethylenes, polybutene-1, ethylene-acrylic acid copolymer, ethylene-vinyl acetate copolymer, ethylene-propylene rubber, styrene-butadiene rubber, ethylene-ethyl acrylate copolymer, ionomer and the like.

Also, as used herein, the propylene polymer material has a melt flow rate of between about 0.05 and 50 and preferably between 0.1 and 10 according to ASTM D1238 Condition L.

The preferred propylene polymer resins for the present invention are those polypropylene resins which are branched or lightly cross-linked polymer materials. Branching (or light cross-linking) may be obtained by those methods generally known in the art, such as chemical or irradiation branching/light cross-linking. One such resin which is prepared as a branched/lightly cross-linked polypropylene resin prior to using the polypropylene resin to prepare a finished polypropylene resin product and the method of preparing such a polypropylene resin is described in U.S. Pat. No. 4,916,198, which is hereby incorporated by reference. Another method to prepare branched/lightly cross-linked polypropylene resin is to introduce chemical compounds into the extruder, along with a polypropylene resin and allow the branching/lightly cross-linking reaction to take place in the extruder. U.S. Pat. No. 4,714,716 teaches this method and is incorporated by reference.

Suitable branching/crosslinking agents for use in extrusion reactions have been found to include azido and vinyl functional silanes, organic peroxides and multifunctional vinyl monomers.

The blowing agent will comprise greater than 85 percent by weight and more preferably greater than 90 percent by weight, and most preferably entirely one or more volatile organic agents based upon the total weight of the blowing agent. Organic blowing agents include aliphatic hydrocarbons having 1-9 carbon atoms, halogenated aliphatic hydrocarbons, having 1-4 carbon atoms, and aliphatic alcohols having 1-3 carbon atoms. Aliphatic hydrocarbons include methane, ethane, propane, n-butane, isobutane, n-pentane, isopentane, neopentane, and the like. Among halogenated hydrocarbons, fluorinated hydrocarbons are preferred. Examples of fluorinated hydrocarbon include methyl fluoride, perfluoromethane, ethyl fluoride, 1,1-difluoroethane (HFC-152a), 1,1,1-trifluoroethane (HFC-143a), 1,1,1,2-tetrafluoro-ethane (HFC-134), pentafluoroethane, perfluoroethane, 2,2-difluoropropane, 1,1,1-trifluoropropane, perfluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), dichlorotetrafluoroethane (CFC-114), chloroheptafluoropropane, and dichlorohexafluoropropane. Fully halogenated chlorofluorocarbons are not preferred due to their ozone depletion potential. Aliphatic alcohols include methanol, ethanol, n-propanol, and isopropanol. A most preferred organic blowing agent is a mixture of HCFC-142b and ethyl chloride.

The blowing agent may comprise in minor proportion (i.e. less than 15 weight percent) one or more inorganic blowing agents or chemical blowing agents. Suitable inorganic blowing agents useful in making the foams of the present invention include carbon dioxide, nitrogen, argon, water air, nitrogen, and helium. Chemical blowing agents include azodicarbonamide, azodiisobutyro-nitrile, benzenesulfonhydrazide, 4,4-oxybenzene sulfonylsemicarbazide, p-toluene sulfonyl semi-carbazide, barium azodicarboxylate, N,N'-dimethyl-N,N'-dinitrosoterephthalamide, and trihydrazino triazine.

The amount of blowing agent incorporated into the polymer melt to make a foam-forming polymer gel is preferably from about 0.05 to about 0.5, and most preferably from about 0.08 to 0.40 gram moles per hundred grams of polymer.

The present foam is greater than 20 percent open cell and preferably from about 30 to about 70 percent open cell according to ASTM D2856-A. The open cell foams provide a high degree of resiliency normally seen only in closed cell foams.

The present foam has the density of about 96 or less kilograms per cubic meter and most preferably less than about 48 kilograms per cubic meter. The foam has an average cell size of about 3 millimeters or less and preferably about 2 millimeters or less according to ASTM D3576.

The present foam may be made in any cross-sectional size or configuration such as foam sheet or plank, but are particularly useful in making plank foam having a major dimension in cross-section of about 5 centimeters or more or a cross-sectional area of about 10 square centimeters or more.

The present foam is preferably substantially non-crosslinked. The term non-crosslinked is inclusive however, of the slight degree of crosslinking which may occur naturally without the use of crosslinking agents.

The present foam has the average cell wall thickness of less than 35, preferably less than 25, and most preferably less than 15 micrometers according to the formula below. It is believed that blowing agents diffuse out more rapidly from thinner cell walls than thicker ones providing more effective quenching and timely stiffening of the cell walls. As a result, the bubbles become more effectively stabilized. In addition, the thin cell walls provide greater resiliency to the cellular material. The thickness of the cell wall may be calculated approximately from the foam density and cell size by the use of the following equation (1):

$$t = 0.46 \, D/B \tag{1}$$

where t is the thickness of cell walls in micrometers ($\mu$) and; D is cell size in $\mu$ and B, the expansion ratio of the cellular body. Since the expansion ratio, B, can be equated the ratio of polymer density ($\rho_p$) to foam density ($\rho_f$), the thickness of the cell wall may be represented by equation (2):

$$t = (0.46/\rho_p)\rho_f D \tag{2}$$

For example, for a polypropylene resin having 900 kg/m$^3$ density to have cell wall thickness less than or equal to 35 micrometers:

$$\rho_f D \leq 4.28 \text{ pcf·mm } (68.5 \text{ kg/m}^3\text{·mm}) \tag{3}$$

preferably, less than or equal to 25 micrometers $$\rho_f D \leq 3.06 \text{ pcf·mm } (48.9 \text{ kg/m}^3\text{·mm}) \tag{4}$$

most preferably, less than or equal to 15 micrometers $$\rho_f D \leq 1.83 \text{ pcf·mm } (29.4 \text{ kg/m}^3\text{·mm}) \tag{5}$$

It was found that a resin having a relatively high melt elasticity is more readily expanded to a good quality foam having a high level of open cells and meeting the foamability criterion as represented by equations (3) through (5). The elasticity of a polymer melt relative to its viscosity may be represented by tan $\delta$, which is the ratio of the loss modulus to the storage modulus. Since it is desirable to have a resin with relatively greater melt elasticity than viscosity, a polypropylene resin having a relatively small tan $\delta$ is preferred. Tan $\delta$ is determined with a mechanical spectrometer, such as model RDS-800, available from Rheometrics, Inc. in Piscataway, N.J., U.S.A. Tan δ value is determined at 190° C. and one radian per second oscillating frequency with a specimen of 2.5 mm thickness and 25 mm diameter. Additional details regarding determination of tan δ are seen at U.S. Ser. No. 07/716,034 filed Jun. 17, 1991.

The present propylene polymer foam is generally prepared by heating a propylene polymer material to form a plasticized or melt polymer material, incorporating therein a blowing agent to form a foamable gel, and extruding the gel through a die to form the foam product. The blowing agent may be incorporated or mixed into the plastic melt by any means known in the art such as with an extruder, mixer, blender, or the like. Prior to mixing with the blowing agent, the plastic material is heated to a temperature at or above the glass transition temperature or the melting point of the plastic material. The blowing agent is mixed with the plastic melt at an elevated pressure sufficient to prevent substantial expansion of the melt and to generally disperse the blowing agent homogeneously within the melt. Optionally, a nucleating agent is blended in the polymer melt. The feeding rate of blowing agent and nucleator are adjusted to achieve a relatively low density foam and small cell size, which results in a foam having thin cell walls. After incorporation of the blowing agent, the foamable gel is typically cooled to a lower temperature to optimize physical characteristics, including the open cell structure, of the foam product. The gel is then extruded through a die of desired shape to a zone of lower or reduced pressure to form the foam product. The zone of lower pressure is at a pressure lower than that in which the foamable gel is maintained prior to extrusion through the die. The lower pressure may be superatmospheric or subatmospheric (vacuum), but is preferably at an atmospheric level.

It is also possible to add various additives such as inorganic fillers, pigments, antioxidants, acid scavengers, ultraviolet absorbers, flame retardants, processing aids, extrusion aids, and the like.

Preferred nucleating agents include inorganic substances such as calcium carbonate, talc, clay, titanium oxide, silica, barium sulfate, diatomaceous earth, mixtures of citric acid and sodium bicarbonate, and the like. The amount of nucleating agent employed may range from about 0.01 to about 5 parts by weight per hundred parts by weight of a polymer resin. The preferred range is from 0.1 to about 3 parts by weight.

Other suitable processes for making the present foam are a coalesced strand foam process as described in U.S. Pat. No. 4,824,720 and an accumulating extrusion process described in U.S. Pat. No. 4,323,528, both hereby incorporated by reference.

U.S. Pat. No. 4,824,720 describes a method for making a closed cell foam structure comprising a plurality of coalesced extruded strands or profiles by extrusion foaming of a molten thermoplastic composition utilizing a die containing a multiplicity of orifices. The orifices are so arranged such that the contact between adjacent streams of the molten extrudate occurs during the foaming process and the contacting surfaces adhere to one another with sufficient adhesion to result in a unitary structure. The individual strands of coalesced polyolefin foam should remain adhered into a unitary structure to prevent strand delamination under stresses encountered in preparing, shaping, and using the foam.

In U.S. Pat. No. 4,323,528, low density, elongated cellular bodies having large lateral cross-sectional areas are prepared by: 1) forming, under pressure, a mixture of a thermoplastic polymer and a blowing agent, with the mixture having a temperature at which the viscosity of the mixture is sufficient to retain the blowing agent when the mixture is allowed to expand; 2) extruding the mixture into a holding zone maintained at a temperature and pressure which does not allow the mixture to foam, the holding zone having an outlet die defining an orifice opening into a zone of lower pressure at which the mixture foams, and an openable gate closing the die orifice; 3) periodically opening the gate; 4) substantially concurrently applying mechanical pressure by a movable ram on the mixture to eject the mixture from the holding zone through the die orifice into the zone of lower pressure, at a rate greater than that at which substantial foaming in the die orifice occurs and less than that at which substantial irregularities in cross-sectional area or shape occurs; and 5) permitting the ejected mixture to expand unrestrained in at least one dimension to produce an elongated thermoplastic cellular body.

The present foam offers excellent cushioning properties and resiliency. The present foams are suitable for cushion packaging since the foams have adequate impact absorption properties and resilience. The foam products mitigate impact during multiple drops. The foams absorb dynamic impacts surprisingly well, particularly given they are open cell. In addition, the open cell foams can be used for sound absorption. The foams can be used for thermal insulation as well.

The present foam has satisfactory dimensional stability even though it is expanded with fast permeating blowing agents. Preferred foams recover $\geq 80$ percent of initial volume within a month with initial volume being measured within 30 seconds after extrusion.

The following are examples of the present invention, and are not to be construed as limiting. Unless otherwise indicated, all percentages, parts, or proportions are by weight.

EXAMPLES

EXAMPLE 1

Open-cell propylene polymer foams of the present invention were prepared according to the present invention. Desirable foaming temperature ranges for making open-cell foams were determined.

The equipment employed was a 1 inch (in) (2.5 centimeters (cm)) screw type extruder having additional zones of mixing and cooling at the end of usual sequential zones of feeding, metering, and mixing. An opening for blowing agent is provided on the extruder barrel between the metering and mixing zones. At the end of the cooling zone, there is attached a die orifice having an opening of rectangular shape. The height of the opening, hereinafter call die gap, is adjustable while its width is fixed at 0.145 in (3.68 millimeters (mm)).

A granular high melt strength (HMS) polypropylene resin having 0.54 melt flow rate (per ASTM D-1238 Condition L) and tan delta of 0.92 was blended with a small amount, 0.1 pph (parts per hundred by weight per 100 parts polymer by weight) of Irganox 1010 brand antioxidant (from Ciba-Geigy Corp.), and fed into the extruder at a uniform rate of approximately 4 pounds per hour (lbs/hr) (1.8 kilograms per hour (kg/hr)). The temperatures maintained in the extruder zones were 175° C. at feeding zone, 210° C. at melting zone, 230° C. at metering zone, and 230° C. at mixing zone. A 60/40 by mole (or 70/30 by weight) mixture of HCFC-142b and EtCl was prepared in a weigh tank, and injected under pressure into the mixing zone at a uniform rate of 0.76 lbs/hr (0.34 kg/hr). The rate amounted to 0.22 pound-moles per one hundred pounds of polymer (abbreviated as mph hereinafter). The level of 0.22 mph corresponds to 0.22 kph (kilogram-moles per hundred kilograms). The die gap was set at 0.012 in (0.30 mm). The temperature of the homogeneous polymer/blowing agent mixture about to undergo foam expansion (called the foaming temperature hereinafter) was gradually reduced by adjusting the temperature of the cooling zone. At each foaming temperature, a foam specimen was obtained. After about a week, each specimen was subjected to certain physical property tests.

Good-quality foams were made at a wide range of foaming temperatures. Table 1 relates the foam density and open cell content with the foaming temperature. At a foaming temperature higher than 164° C., the foam collapsed totally or partially. At 164° C., a temperature region where a stable, open cell foam could be made was approached. At a foaming temperature range from 164° C. to 155° C., foams having 60-70 percent open cells were produced. As the temperature was dropped further, both the open cell content and the foam density decreased until the temperature reaches 150° C. Below 150° C., the foams were essentially close-cell, and the foam density leveled off. At a foaming temperature of 143° C., indications of freezing of the melt in the cooling zone were observed in the form of lumps in the foam body and variations in the shape of the foam strand. As seen in Table 1, the temperature window ($\Delta T_f$) for the closed-cell foam was approximately 144° C.-150° C. ($\Delta T_f = 7°$ C.) for this polymer/blowing agent system. That for the partially open-cell foam was 151° C.-163° C. ($\Delta T_f = 13°$ C.). If the threshold temperature for a closed-cell foam is defined as $T_{f,max}$, the operable foaming temperature for the partially open-cell foam was in the range between ($T_{f,max}+1$) and ($T_{f,max}+13$). The range will vary according to polymer/blowing agent systems. For this system, the optimum foaming temperature for a closed-cell foam was approximately 147° C. (middle point of the range for closed-cell foams). This example showed that a substantially open-cell foam can be extruded from a polypropylene/organic blowing agent system by a proper control of foam density, cell size and foaming temperature.

TABLE 1

| Foaming Temp. (C.°)[1] | Foam Density (pcf) (kg/m³)[2] | Cell Size (mm)[3] | $\rho_f D$ (pcf mm)[4] | Open Cell (percent)[5] |
| --- | --- | --- | --- | --- |
| 164 | --Foam | collapsed | partially-- | |

TABLE 1-continued

| Foaming Temp. (C.°)[1] | Foam Density (pcf) (kg/m³)[2] | Cell Size (mm)[3] | $\rho_f D$ (pcf mm)[4] | Open Cell (percent)[5] |
| --- | --- | --- | --- | --- |
| 163 | 1.66(26.6) | 0.95 | 1.58 | 69 |
| 162 | 1.63(26.1) | 0.95 | 1.55 | 70 |
| 161 | 1.59(25.4) | 0.95 | 1.51 | 67 |
| 160 | 1.51(24.2) | 1.08 | 1.63 | 62 |
| 159 | 1.55(24.8) | 1.47 | 2.28 | 68 |
| 158 | 1.65(26.4) | 1.47 | 2.43 | 66 |
| 157 | 1.62(25.9) | 1.47 | 2.38 | 71 |
| 156 | 1.48(23.7) | 1.80 | 2.66 | 69 |
| 155 | 1.49(23.8) | 1.80 | 2.68 | 69 |
| 154 | 1.44(23.0) | 1.80 | 2.59 | 45 |
| 153 | 1.35(21.6) | 1.80 | 2.43 | 31 |
| 152 | 1.37(21.9) | 1.35 | 1.85 | 20 |
| 151 | 1.35(21.6) | 1.47 | 1.98 | 21 |
| 150* | 1.27(20.3) | 1.47 | 1.87 | 8 |
| 149* | 1.27(20.3) | 2.03 | 2.58 | 6 |
| 148* | 1.29(20.6) | 2.03 | 2.62 | 6 |
| 147* | 1.34(21.4) | 1.62 | 2.17 | 5 |
| 146* | 1.31(21.0) | 1.62 | 2.12 | 0 |
| 145* | 1.31(21.0) | 1.47 | 1.93 | 5 |
| 144* | 1.32(21.1) | 1.47 | 1.94 | 0 |
| 143* | 1.34(21.4) | 1.35 | 1.81 | 4 |

*Not within the scope of this invention.
[1] Temperature in degrees Celcius of the polymer/blowing agent mixture about to undergo foam expansion
[2] Density of foam body in pounds per cubic foot (kilograms per cubic meter) measured in about 9 days after foam expansion
[3] Cell size in millimeters determined per ASTM D3576
[4] The product of foam density and cell size
[5] Open cell content in percentage determined per ASTM D2856-A

EXAMPLE 2

Open-cell propylene polymer foams of the present invention were prepared according to the present invention. Desirable blowing agent levels for making open-cell foams were determined.

The apparatus, polymer and blowing agent of Example 1 were employed.

The effect of blowing agent level on foamability of the polypropylene resin was determined. The foaming temperature was to be kept constant at 148° C., but was raised to 151° C. for 0.13 mph (0.13 kph) blowing agent level to prevent the polymer melt from freezing. The process and property data are represented in Table 2. At 148° C. foaming temperature, where a blowing agent level of 0.22 mph (0.22 kph) provided a closed cell as seen in Example 1, 0.19 mph (0.19 kph) blowing agent also provided a substantially closed-cell foam. Open cell content increased as the level of the blowing agent decreased—36 percent at 0.16 mph (0.16 kph) and 69 percent at 0.13 mph (0.13 kph). At 0.13 mph blowing agent level, a small amount of talcum powder was added to reduce the cell size and the foaming temperature was increased.

TABLE 2

| Test No. | Blowing Agent Level (mph)[1] | Talc Level (pph)[2] | Foaming Temp. (C°.)[3] | Foam Density (pcf) (kg/m³)[4] | Cell Size (mm)[5] | $\rho_f D$ (pcf mm)[6] | Open Cell (percent)[7] |
| --- | --- | --- | --- | --- | --- | --- | --- |
| II.1* | 0.19 | — | 148 | 1.37 (21.9) | 1.62 | 2.22 | 2 |
| II.2 | 0.16 | — | 148 | 1.61 (25.8) | 2.03 | 3.27 | 36 |
| II.3 | 0.13 | 0.03 | 151 | 2.01 | 1.01 | 2.03 | 69 |

TABLE 2-continued

| Test No. | Blowing Agent Level (mph)[1] | Talc Level (pph)[2] | Foaming Temp. (C°.)[3] | Foam Density (pcf) (kg/m³)[4] | Cell Size (mm)[5] | $\rho_f D$ (pcf mm)[6] | Open Cell (percent)[7] |
|---|---|---|---|---|---|---|---|
| | | | | (21.2) | | | |

*Not an example of this invention
[1]Pound moles of blowing agent mixed in per one hundred pounds of polymer (corresponding to kph)
[2]Parts of talcum powder mixed in per one hundred parts of polymer by weight
[3]Temperature in degrees Celsius of the polymer/blowing agent mixture about to undergo foam expansion
[4]Density of foam body in pounds per cubic foot (kilograms per cubic meter) measured in 9 days after foam expansion
[5]Cell size in millimeters determined per ASTM D3576
[6]The product of foam density and cell size
[7]Open cell content in percentage determined per ASTM D2856-A

EXAMPLE 3

Open cell foams of the present invention were prepared according to the present invention. The foams were prepared with a propylene copolymer.

The apparatus as in Example 1 was employed. A 2/98 (by weight) ethylene/propylene random copolymer having 0.39 melt flow rate (ASTM D-1238 Condition L) and 1.09 tan delta was foamed by the procedure of Example 1 with the blowing agent of Example 1. As in Examples 1 and 2, 0.1 pph antioxidant (Irganox 1010) was employed. The temperatures maintained at the extruder zones were 160° C. at feeding zone, 180° C. at melting zone, 200° C. at metering zone and 230° C. at mixing zone. Foams were prepared over both a foaming temperature range and a blowing agent level range. As the foaming temperature was decreased, the die gap was slightly increased from 0.012 in (0.30 mm) to 0.017 in (0.43 mm) to achieve the desired foam cross-section without prefoaming.

Low density, open-cell foams were made using the copolymer resin at a relatively wide foaming temperature range. As seen in Table 3, making a closed-cell foam with the copolymer resin was difficult as indicated by the narrow range of foaming temperature (139° C.–141° C.) for low open-cell content. In contrast, low density, open-cell foams are easily achieved from this resin for the temperature range of 142° C.–147° C. The foaming temperature 144° C.–145° C. yielded open-cell foams with optimal 40–50 percent open cell content and the lowest foam densities.

TABLE 3

| Test No. | Blowing Agent Level (mph)[1] | Talc Level (pph)[2] | Foaming Temp. (C°.)[3] | Foam Density (pcf) (kg/m³)[4] | Cell Size (mm)[5] | $\rho_f D$ (pcf mm)[6] | Open Cell (percent)[7] |
|---|---|---|---|---|---|---|---|
| III.1 | 0.22 | — | 151 | 3.34 (53.4) | 0.65 | 2.17 | 40 |
| | " | | 150 | 2.74 (43.8) | 0.85 | 2.33 | 35 |
| | " | | 149 | 2.02 (32.3) | 0.81 | 1.64 | 86 |
| | " | | 148 | 1.80 (28.8) | 0.95 | 1.71 | 80 |
| | " | | 147 | 1.53 (24.5) | 0.90 | 1.38 | 45 |
| | " | | 146 | 1.43 (22.9) | 0.90 | 1.29 | 61 |
| | " | | 145 | 1.38 (22.1) | 1.01 | 1.39 | 43 |
| | " | | 144 | 1.37 (21.9) | 1.10 | 1.38 | 47 |
| * | " | | 143 | 1.40 (22.4) | 1.01 | 1.41 | 15 |
| | " | | 142 | 1.44 (23.0) | 0.95 | 1.37 | 23 |
| * | " | | 141 | 1.43 (22.9) | 0.95 | 1.36 | 12 |
| * | " | | 140 | 1.42 (22.7) | 1.01 | 1.43 | 3 |
| * | " | | 139 | 1.40 (22.4) | 0.85 | 1.19 | 12 |
| III.2 | 0.19 | — | 142 | 1.55 (24.8) | 0.95 | 1.47 | 83 |
| III.3 | 0.19 | 0.03 | 141 | 1.55 (24.8) | 0.85 | 1.32 | 47 |

*Not an example of this invention
[1]Pound moles of blowing agent mixed in per one hundred pounds of polymer(corresponding to kph)
[2]Parts of talcum powder mixed in per one hundred parts of polymer by weight
[3]Temperature in degrees Celsius of the polymer/blowing agent mixture about to undergo foam expansion
[4]Density of foam body in pounds per cubic foot (kilograms per cubic meter) measured in 9 days after foam expansion
[5]Cell size in millimeters determined per ASTM D3576
[6]The product of foam density and cell size
[7]Open cell content in percentage determined per ASTM D2856-A
— Test No. III.1 constituted 13 foam specimens made with a constant blowing agent level and different foaming temperatures

EXAMPLE 4

Open cell foams of the present invention were prepared according to the present invention. The foams were prepared using an accumulating extrusion system (AES).

The apparatus is as in Examples 1 through 3 except the die is replaced with the AES. The AES consisted of a jacketed 300 cubic centimeter capacity pressure vessel, nitrogen pressurizing system, and a gap-adjustable 0.25 in (0.64 cm) width die orifice. The pressure vessel, the transfer lines, and the die were maintained at or slightly above the temperature of the foamable melt so that the material will neither acquire excessive heat nor become frozen off. After the desired foaming condition was established, the melt was accumulated in the vessel under nitrogen back pressure of about 700 pounds per square inch gauge (psig) (4830 kilopascals gauge (kPag)). After a prescribed amount of the melt was accumulated, nitrogen gas (regulated to 1300 psig (8960 kPag)) was introduced to the top of the vessel and the foamable melt was discharged out of the die orifice to expand.

Three 2/98 weight ratio ethylene/propylene copolymers having different melt flow rates were evaluated. One copolymer is as in Example 3. The tan delta values of the resins were 1.11 for the 0.26 MFR resin, 0.87 for the 0.57 MFR resin and 1.09 for the 0.39 MFR resin. As in Examples 1 through 3, a 60/40 by mole mixture of HCFC-142b/EtCl was used as the blowing agent. The data was summarized in Table 4. All three resins provided good-quality foams having large cross-sections of 16–18 square centimeters ($cm^2$), small cell size, and low densities. The operating temperature conditions were such that the open-cell contents varied widely from resin to resin. The 0.39 MFR resin provided almost fully open-cell foam at 140° C., while the 0.26 MFR provided one having only 14 percent open cells at 147° C. A foam having an intermediate open cell content (27 percent) was accomplished from the 0.57 MFR resin at 145° C. Understandably, open cell contents of these foams may be altered by choosing a different set of operating conditions (temperature, cell size, and density).

TABLE 4

| Test No. | Resin MFR[1] | Blowing Agent Level (mph)[2] | Talc Level (pph)[3] | Foaming Temp. (C.°)[4] | Foam Density (pcf) (kg/m³)[5] | Cell Size (mm)[6] | $p_fD$ (pcf·mm)[7] | Open Cell (percent)[8] |
|---|---|---|---|---|---|---|---|---|
| IV.1* | 0.26 | 0.19 | — | 147 | 1.18 (18.88) | 0.58 | 0.68 | 14 |
| IV.2 | 0.57 | 0.18 | — | 145 | 1.20 (19.20) | 0.58 | 0.70 | 27 |
| IV.3 | 0.39 | 0.19 | 0.02 | 140 | 1.37 (21.92) | 0.51 | 0.70 | 92 |

*Not an example of this invention
[1]Melt flow rate in decigrams per minute of 2/98 ethylene/propylene copolymer used;determined per ASTM D1238 at Condition L
[2]Pound moles of blowing agent mixed in per one hundred pounds of polymer (corresponding to kph)
[3]Parts of talcum powder mixed in per one hundred parts of polymer by weight
[4]Temperature in degrees Celsius of the polymer/blowing agent mixture about to undergo foam expansion
[5]Density of foam body in pounds per cubic foot (kilograms per cubic meter) measured in 9 days after foam expansion
[6]Cell size in millimeters determined per ASTM D3576
[7]The product of foam density and cell size
[8]Open cell content in percentage determined per ASTM D2856-A

EXAMPLE 5

Open cell foams of the present invention were prepared according to the present invention. The foams were prepared with a high melt strength (HMS) polypropylene homopolymer and several different blowing agents.

This apparatus and operating procedure were substantially the same as in Example 1. An HMS polypropylene homopolymer having melt flow rate (MFR, the MFR was determined per ASTM D1238 at Condition L unless otherwise specified herein after) and tan δ of 1.09 was expanded with several different blowing agents. For mixed blowing agents, constituent blowing agents were premixed prior to injection into the extruder. As shown in Table 5, a small amount of talcum powder was incorporated in some tests for reduction of cell size. In tests where HFC-134a is used as a blowing agent, a small amount of glycerol monostearate (GMS) was incorporated to enlarge the cell size. GMS, in concentrate form, and talc were preblended with the polypropylene granules and fed into the extruder at a uniform rate of 4 pounds per hour (1.81 kgs/hr). The temperature maintained in the extruder zones were 150° C. at the feeding zone, 200° C. at the melting zones, 220° C. at metering zone, and 230° C. at mixing zone.

The cooling zone temperature was maintained to uniformly cool the gel (melt mixture of polymer and blowing agent) down to about 150° C.–151° C. The die opening was adjusted for each gel to yield foam strands free of prefoaming. Foam dimensional stability was measured with two specimens of about 5 inch (12.7 cm) in length. As set forth in Table 5, all the single or mixed blowing agents provided good-quality, low-density foams having 24 percent or greater open cells at the foaming temperature. All foams meet the foamability criterion, $p_fD \leq 4.28$ pcf·mm (68.5 kg/m³·mm). With the relatively high open cell contents, all foams exhibit excellent dimensional stability.

TABLE 5

| Test No. | Blowing Agent Type[1] | Ratio[2] | Level[3] | Additive Type[4] | Level[5] | Foam Density pcf[6] | kcm[7] | Cell Size (mm)[8] | $p_fD$ (pcf mm)[9] | Open Cell (percent)[10] | Dim. Stabil.[11] |
|---|---|---|---|---|---|---|---|---|---|---|---|
| 5.1 | HCFC-142b/n-C4 | 60/40 | 0.22 | | | 1.39 | 22.3 | 0.48 | 0.67 | 28 | 98 |
| 5.2 | HCFC-142b/HCFC-141b | 60/40 | 0.22 | talc | 0.02 | 1.17 | 18.7 | 0.77 | 0.90 | 49 | 102 |
| 5.3 | HCFC-124 | | 0.22 | | | 1.47 | 23.5 | 0.10 | 0.15 | 24 | 97 |
| 5.4 | HCFC-141b | | 0.22 | talc | 0.08 | 1.39 | 22.3 | 1.35 | 1.88 | 86 | 99 |
| 5.5 | HFC-134a | | 0.22 | talc | 0.02 | 1.92 | 30.7 | 0.10 | 0.19 | 52 | 97 |

TABLE 5-continued

| Test No. | Blowing Agent Type[1] | Ratio[2] | Level[3] | Additive Type[4] | Level[5] | Foam Density pcf[6] | kcm[7] | Cell Size (mm)[8] | $p_fD$ (pcf mm)[9] | Open Cell (percent)[10] | Dim. Stabil.[11] |
|---|---|---|---|---|---|---|---|---|---|---|---|
| 5.6 | HFC-134a | | 0.22 | GMS | 0.5 | 1.92 | 30.7 | 0.11 | 0.21 | 29 | ND |
| 5.7 | HFC-134a/n-C4 | 60/40 | 0.16 | GMS | 0.5 | 2.04 | 32.7 | 0.12 | 0.24 | 30 | 98 |
| 5.8 | HFC-134a/HCFC-123 | 60/40 | 0.12 | GMS | 0.5 | 2.11 | 33.8 | 0.49 | 1.03 | 62 | 99 |
| 5.9 | HFC-152a | | 0.16 | | | 1.57 | 21.9 | 0.62 | 0.97 | 28 | 100 |
| 5.10 | HFC-152a/EtCl | 60/40 | 0.19 | | | 1.64 | 26.3 | 0.81 | 1.33 | 64 | 99 |
| 5.11 | HFC-152a/HCFC-141b | 60/40 | 0.19 | | | 2.05 | 32.8 | 2.03 | 4.16 | 89 | 98 |

[1]n-C4 = normal butane
[2]Molar ratio of two blowing agents
[3]Pound moles of blowing agent mixed in per one hundred pounds of polymer
[4]GMS = glycerol monostearate
[5]Parts of additive mixed in per hundred parts of polymer
[6]Density of foam body in pounds per cubic foot aged for 14 days or longer after foam expansion
[7]Density of foam body in kilograms per cubic meter measured in 14 days or longer after foam expansion
[8]Cell size in millimeters determined per ASTM D3576
[9]The product of foam density and cell size
[10]Open cell content in percentage determined per ASTM D2856-A
[11]Minimum volume of foam body experiencing during aging as a percentage of the initial measured within about 30 seconds after extrusion

EXAMPLE 6

Open cell foams of the present invention were prepared according to the present invention. Low density, large cross-section open cell foam planks were prepared using a multi-orifice die and a forming plate assembly.

The apparatus was substantially the same as in Example 1 except for a different extruder and die. The extruder was a 1½ inch (3.8 cm) single screw type. The die was a multi-orifice die with 0.030 inch (0.76 mm) diameter orifices arranged in rows and columns in a equilateral triangular pattern with 0.144 inch (3.7 mm) spacing between holes. Seventy-two holes (8 rows and 9 columns) were open. A forming plate assembly was attached at the die face. The forming plate assembly consisted of two horizontal forming plates and two guide shoes designed to guide the edges of the foam. The forming plates were made of carbon graphite, and the clearance between the two plates was adjustable by moving the plates vertically. The side shoes, angled 45 degree outward and lined with Teflon (trademark of E.I. DuPont de Nemours & Com) sheet, could be moved in and out.

A HMS 2/98 ethylene/propylene random copolymer having a melt flow rate of 0.5 and tan δ of 0.96 was employed. The granular resin was mixed with 0.1 pph talcum powder for cell size control and 0.2 pph antioxidants. The antioxidants consisted of 50 percent IRGANOX 1010 brand hindered phenol-type (Ceba-Geigy Corp.) and 50 percent ULTRANOX 626 brand (Borg-Warner Chemical, Inc.) phosphite-type. The antioxidants were made into a concentrate form in the base resin. The solid mixture was fed into the extruder at a uniform rate of approximately 10 lbs/hr (4.5 kg/hr). The temperatures maintained at the extruder zones were 185° C. at feeding zone, 200° C. at melting zone, 230° C. at metering zone, and 200° C. at mixing zone. A 60/40 by mole mixture of HFC-152a and ethyl chloride was injected under pressure into the mixing zone at a uniform rate of 1.37 lbs/hr (0.62 kgs/hr) which amounts to approximately 0.21 mph. The homogenized mixture of polymer and blowing agent was cooled down to approximately 157° C. at the die to produce stable foam strands.

After an unfoamed sample was taken, the forming plates were applied to both sides of foam surfaces and the side shoes were moved in to guide the foam body at the edges. In order to overcome the drag created by the plates, the foam body must be gently pulled away. As seen in Table 6, forming had a significant effect on the foam quality, density and cross-sectional size. The unformed foam body, was a collection of loosely coalesced cylindrical strands, with channels among the strands, relatively high foam density, small cross-section and rough surfaces reflecting the contour of the cylinders. Forming made the strands enlarged, deformed to hexagonal honey comb shapes, and compacted with no voids thereby providing an excellent quality foam having lower density, larger cross-sectional size and smooth skin. With its high open cell content, the foam was strong upon compression and recovered readily after compression.

TABLE 6

| Test No. | Forming Plates[1] | Foam Density pcf[2] | kcm[3] | Cell Size (mm)[4] | Strand Dia.[5] | Thick.[6] | Width[7] | $p_fD$ (pcf mm)[8] | Open Cell (percent)[9] |
|---|---|---|---|---|---|---|---|---|---|
| 6.1 | no | 1.98 | 31.7 | 0.36 | 3.1 | 2.4 | 3.3 | 0.71 | 71 |
| 6.2 | yes | 1.40 | 22.4 | 0.54 | 6.7 | 3.8 | 6.0 | 0.76 | 66 |

[1]no = free foaming without forming plates applied; yes = forming plates applied
[2]Density of foam body in pounds per cubic foot aged for 14 days or longer after foam expansion
[3]Density of foam body in kilograms per cubic meter measured in 14 days after foam expansion
[4]Cell size in millimeters determined per ASTM D3576
[5]Diameter of foam body in centimeters
[6]Thickness of foam body in centimeters
[7]Width of foam body in centimeters
[8]The product of foam density and cell size
[9]Open cell content in percentage determined per ASTM D2856-A

EXAMPLE 7

This example illustrates that forming leads to an open-cell polypropylene foam having desired well-balanced strength distribution, resiliency and dynamic cushioning properties.

The apparatus was a 1¾ inch (4.4 cm) screw type extruder having substantially the same configuration as the one of Example 6. The apparatus employed the multi-orifice die of Example 6. One hundred fifty-four holes (11 rows and 13 columns) were open at the die. The forming plate assembly was as in Example 6.

both the first and multiple drops indicated that its cushioning properties were adequate for most applications.

TABLE 7A

| Test No. | Forming Plates[1] | Foam Density | | Cell Size (mm)[4] | Strand Dia.[5] | Thick.[6] | Width[7] | $p_fD$ (pcf mm)[8] | Open Cell (percent)[9] | Compressive Strength | | |
|---|---|---|---|---|---|---|---|---|---|---|---|---|
| | | pcf[2] | kcm[3] | | | | | | | V[10] | E[11] | H[12] |
| 7.1 | no | 1.98 | 31.7 | 0.43 | 3.7 | 3.1 | 4.4 | 0.85 | 34 | 75 | 250 | 74 |
| 7.2 | yes | 1.44 | 23.1 | 0.49 | 5.6 | 4.9 | 8.0 | 0.71 | 46 | 80 | 57 | 86 |

[1]no = free foaming without forming plates applied; yes = forming plates applied
[2]Density of foam body in pounds per cubic foot aged for 14 days or longer after foam expansion
[3]Density of foam body in kilograms per cubic meter measured in 14 days after foam expansion
[4]Cell size in millimeters determined per ASTM D3576
[5]Diameter of foam body in centimeters
[6]Thickness of foam body in centimeters
[7]Width of foam body in centimeters
[8]The product of foam density and cell size
[9]Open cell content in percentage determined per ASTM D2856-A
[10,11,12]Compressive strength of foam body at 25% deflection in vertical, extrusion, and horizontal direction, respectively, in kilopascals measured per ASTM D3575B The polypropylene resin of Example 6 was expanded with a 60/40 by mole mixture of HCFC-152b/EtCl, and then formed. The antioxidant package was as in Example 6. Talcum powder was employed at 0.5 pph. The solids were fed into the extruder at a uniform rate of approximately 25 lbs/hr (11.4 kg/hr). The temperatures maintained at the extruder zones were 175° C. at the feeding zone, 200° C. at melting zone, 230° C. at metering zone, and 200° C. at mixing zone. The premixed blowing agent was injected under pressure into the mixing zone at a rate of 4.1 lbs/hr (1.9 kg/hr), which amounts to 6.4 parts per hundred parts of polymer or approximately 0.19 mph.

The gel of melt polymer and blowing agent was cooled down to approximately 152° C. to produce stable foam stands. The foam strands had fine cell size and approximately 3.7 mm in diameter loosely sticking to each other. The density of the foam strands was 32 kg/m³, and the cell size was 0.43 mm. The foam cross-section was small, and the foam surface was rough. After an unformed sample was taken, the forming plates were closed together to give a drag on the foam, then the plates were opened to provide a large cross-section. The side shoes were pushed in to guide the foam at the edges. The foam body was gently pulled away to overcome the drag created by the forming plates. With forming, an excellent quality foam having a larger cross-sectional size with well coalesced strands was achieved. The strands were deformed to form perfect honeycomb shapes, and the foam surfaces turned smooth with the surface strands flattened out. Other benefits of forming may be noted from Table 5, where the properties of the formed foam body are compared. The benefits include a 28 percent reduction in foam density, almost tripling of foam cross-sectional size, and more balanced directional strength. Ordinarily, an extruded foam plank sees strength oriented toward the extrusion direction, but the applied loads are often applied in the vertical direction in actual cushioning applications. Table 7A clearly indicates that forming can redistribute strength toward the transverse directions (vertical and horizontal directions).

The open-cell polypropylene foam was tested for cushion packaging applications. All foam specimens had 1.5 inch (3.8 cm) thickness (which is the stress direction), and 2.5 inch×3.0 inch (6.4 cm×7.6 cm) load bearing area. The peak deceleration experienced by a weight dropped on the foam specimens from a 24 inch (61 cm) height was measured. The performance of the open-cell polypropylene in mitigating impacts during

TABLE 7B

| Property[1] | Static Stress[2] | PP Foam[3] | | |
|---|---|---|---|---|
| | | V | E | H |
| Compressive Str. (kPa) @25% Deflection | | 80 | 57 | 86 |
| Dynamic Cushioning (g) @Static Stress(kPa) | | | | |
| 1st Drop | 1.7 | 74 | 70 | 82 |
| | 5.8 | 46 | 51 | 48 |
| | 7.6 | 48 | 56 | 46 |
| | 9.4 | 54 | 65 | 53 |
| | 13.2 | 71 | 91 | 68 |
| 2-5 Drop Average | 1.7 | 86 | 71 | 85 |
| | 5.8 | 61 | 63 | 61 |
| | 7.6 | 68 | 79 | 67 |
| | 9.4 | 81 | 88 | 81 |
| | 13.2 | 119 | 129 | 119 |

[1]Compressive deflection at 25% deflection in kilopascals determined per ASTM D3575B
Dynamic cushioning = peak deceleration in gs with a weight exerting the specified static stress during the first drop (1st Drop) and second through the fifth drops (2-5 Drop Average)
[2]Static stress exerted on the foam specimens in kilopascals
[3]Properties measured in the vertical (V), extrusion (E), and horizontal (H) directions, respectively, for the polypropylene foam product

EXAMPLE 8

Open cell foams of the present invention were prepared according to the present invention. The foams were prepared with a HMS propylene copolymer and subjected to forming.

The forming test of Example 7 was repeated with a HMS 2/98: ethylene/propylene copolymer having melt flow rate of 0.8 and tan value of 1.60. A sodium bicarbonate/citric acid mixture-type (Hydrocerol CF-20 brand made by Boehringer Ingelheim KG, Germany) nucleator was employed as the cell size control agent. Except for the cooling zone and die, the extruder zones were set at the same temperatures as in Example 7. In the tests of this example, there were employed mixed hydrocarbon blowing agents: a 60/40 by mole mixture of isobutane and normal pentane in Test 8.1 and a 70/30 by mole mixture of isobutane and normal butane in Test 8.2. The polymer extrusion rate was maintained at 25 lbs/hr (11.3 kg/hr), and the blowing agent rate was adjusted so that its level would be 0.25 mph in both tests. A total of 156 holes (12 rows×13 rows) and 143 holes (11 rows ×13 rows) were opened in Test 8.1 and 8.2, respectively. Good foams were made when the gel was cooled down to approximately 137° C. and 140° C. in Test 8.1 and 8.2, respectively. The forming plate assembly was applied to the foam strands coming out of the die. Excellent quality foams were achieved in both tests.

TABLE 8

| Test No. | Blowing Agent[1] | Nucleator[2] | Foam Density pcf[3] | Foam Density kcm[4] | Cell Size (mm)[5] | Thick.[6] | Width[7] | $p_fD$ (pcf mm)[8] | Open Cell (percent)[9] | Compressive Strength V[10] | Compressive Strength E[11] | Compressive Strength H[12] |
|---|---|---|---|---|---|---|---|---|---|---|---|---|
| 8.1 | i-C4/n-C5 | 0.8 | 1.51 | 24.2 | 0.85 | 4.8 | 7.1 | 1.28 | 66 | ND | ND | ND |
| 8.2 | i-C4/n-C4 | 0.6 | 1.38 | 22.1 | 0.60 | 3.9 | 7.4 | 0.83 | 72 | 42 | 33 | 46 |

[1] i-C4 = isobutane; n-C5 = normal pentane; n-C4 = normal butane
[2] Parts of Hydrocerol CF-20 mixed in per one hundred parts of polymer
[3] Density of foam body in pounds per cubic foot aged for 14 days or longer after foam expansion
[4] Density of foam body in kilograms per cubic meter measured in 14 days after foam expansion
[5] Cell size in millimeters determined per ASTM D3576
[6] Thickness of foam body in centimeters
[7] Width of foam body in centimeters
[8] The product of foam density and cell size
[9] Open cell content in percentage determined per ASTM D2856-A
[10,11,12] Compressive strength of foam body at 25% deflection in vertical, extrusion, and horizontal direction, respectively, in kilopascals measured per ASTM D3575B
ND - Not determined

EXAMPLE 9

Open cell foams of the present invention were prepared according to the present invention. The foams were prepared using a larger-scale apparatus with a multi-orifice die.

The apparatus having substantially the same configuration as in Example 1 except a 3½ inch (8.9 cm) screw type extruder and a different die. The die was a multi-orifice die having 2016 orifices of 0.041 inch (1.04 mm) diameter arranged in 18 rows and 112 columns in a equilateral triangular pattern with 0.25 inch (0.64 cm) distance between orifices. The operating procedure was substantially the same as in Example 1.

A HMS 2/98 ethylene/propylene random copolymer having a melt flow rate of 0.34 (ASTM D-1238 Condition L) was mixed with 0.05 pph talcum powder and 0.2 pph antioxidants. The antioxidants consisted of 50 percent by weight Irganox 1010 brand hindered phenol-type (Ciba-Geigy Corp.) and 50 percent by weight Ultranox 626 brand (Borg-Warner Chemical, Inc.) phosphite-type by weight. The antioxidants had been pre-compounded into master batches in the base resin. The solid mixture was fed into the extruder at a uniform rate of approximately 400 lbs/hr (182 kg/hr). The temperatures maintained at the extruder zones were 130° C. at feeding zone, 200° C. at melting zone, 230° C. at metering zone and 210° C. at mixing zone. HCFC-142b was injected under pressure into the mixing zone at a rate of 79 lbs/hr (36 kg/m³), which amounts to 19.8 parts per hundred parts of polymer or approximately 0.20 mph (0.20 kph). When the homogeneous mixture of polymer and blowing agent was cooled down to approximately 154° C., a good foam having a fine cell size was achieved. The foam strands coalesced well together resulting in a foam plank with most of the interstices or channels filled. The foam cross-sectional size was approximately 2.4 in×23.8 in (6.1 cm×60 cm).

The foam exhibited excellent dimensional stability during aging suffering almost no change (less than 1 percent). Properties of the foam were determined in two weeks after extrusion. The foam had 1.48 pcf (23.7 kg/m³) density, 0.58 mm cell size, and 61 percent open cells. The foam had a vertical compressive strength of approximately 7 psi (48 kPa) at 25 percent deflection and, after 80 percent compressive deflection, recovered well to 95 percent of its original thickness within one hour and 96 percent of its original thickness within one day. The foam had a thermal conductivity of 0.295 B.t.u./(hr)(ft²) (F°/in)(0.042 W/m·K°). With its resiliency and low thermal conductivity, the polypropylene foam is not only suitable for cushion packaging but also for insulation applications.

EXAMPLE 10

Open cell foams of the present invention were prepared according to the present invention. The foam was prepared in plank form with a HMS polypropylene homopolymer.

The foaming apparatus, the resin feedstock, and blowing agent were substantially the same as in Example 9 except a gap-adjustable slit die of 1 inch width was employed to produce a plank foam.

The polymer feedstock was mixed with antioxidant package of Example 9. Talc was not incorporated. The feedstock was fed into the extruder at a uniform rate of approximately 250 lbs/hr (114 kg/hr). The extruder zones were set at the same temperatures as in Example 5. HCFC-142b was injected under pressure into the mixing zone at a rate of 50 lbs/hr (23 kg/hr), which amount to 20 parts per hundred parts of polymer by weight or approximately 0.20 mph (0.20 kph). When the gel of melt polymer/blowing agent was uniformly cooled down to an optimum foaming temperature of 153° C., the die gap was adjusted to prepare a foam free of prefoaming. At a die gap of 0.135 inch (0.343 cm), which was the threshold die opening for prefoaming, a good quality foam of 1.9 in×4.2 in (4.8 cm×10.7 cm) cross-section was achieved.

Like the coalesced strand plank of Example 9, the foam exhibited excellent dimensional stability during aging with almost no shrinkage (less than 1 percent). Properties of the foam were measured two weeks after extrusion. The foam had 1.18 pcf (18.9 kg/m³) density, 1.49 mm cell size, and 84 percent open cells. The foam had a vertical compressive strength of 5.8 psi (40 kPa) at 25 percent deflection and, after 80 percent compression, recovered to 91 percent of its original thickness within one day.

While embodiments of the foam and the process of the present invention have been shown with regard to specific details, it will be appreciated that depending upon the manufacturing process and the manufacturer's desires, the present invention may be modified by various changes while still being fairly within the scope of the novel teachings and principles herein set forth.

What is claimed is:

1. A dimensionally-stable, extruded, open-cell, propylene polymer foam, comprising: a propylene polymer material comprising greater than 50 percent by weight of propylene monomeric units, the foam having a density about 96 kilograms per cubic meter or less, the foam being greater than 20 percent open cell, the foam being in plank form, the foam having a major dimension in cross-section of about 5 centimeters or more, the foam have a cross-sectional area of about 10 square centimeters or more.

2. The foam of claim 1, wherein the foam is from about 30 to about 70 percent open cell.

3. The foam of claim 1, wherein the foam has an average cell size of about 2 millimeters or less.

4. The foam of claim 1, wherein the foam has a density of less than about 48 kilograms per cubic meter.

5. The foam of claim 1, wherein the propylene polymer material comprises greater than 70 percent by weight of propylene monomeric units.

6. The foam of claim 1, wherein the foam additionally comprises glycerol monostearate.

7. The foam of claim 1, wherein the foam has an average cell wall thickness of less than 35 micrometers.

8. The foam of claim 1, wherein the foam has an average cell wall thickness of less than 25 micrometers.

9. The foam of claim 1, wherein the foam has an average cell wall thickness of less than 15 micrometers.

* * * * *